United States Patent
Singh et al.

(10) Patent No.: US 10,417,331 B2
(45) Date of Patent: Sep. 17, 2019

(54) SYSTEM AND METHOD FOR PROCESSING COMMAND LINE INTERFACE COMMANDS

(71) Applicant: VMware, Inc., Palo Alto, CA (US)

(72) Inventors: Ashish Singh, San Jose, CA (US); Kaushal Gala, Round Rock, CA (US); Srikkanth Sundararajan, Sunnyvale, CA (US); Raghavendra Kolli, Sunnyvale, CA (US); Lakshmi Kiran Soppadandi, Sunnyvale, CA (US)

(73) Assignee: VMware, Inc., Palo Alto, CA (US)

( * ) Notice: Subject to any disclaimer, the term of this patent is extended or adjusted under 35 U.S.C. 154(b) by 600 days.

(21) Appl. No.: 15/074,880

(22) Filed: Mar. 18, 2016

(65) Prior Publication Data

US 2017/0270091 A1    Sep. 21, 2017

(51) Int. Cl.
*G06F 16/00* (2019.01)
*G06F 17/27* (2006.01)
*G06F 9/451* (2018.01)
*G06F 9/455* (2018.01)

(52) U.S. Cl.
CPC ............ *G06F 17/276* (2013.01); *G06F 9/453* (2018.02); *G06F 9/45512* (2013.01)

(58) Field of Classification Search
CPC ...... G06F 17/276; G06F 9/453; G06F 3/0984; G06F 3/0484; G06F 9/45512
USPC .......................................................... 707/722
See application file for complete search history.

(56) References Cited

U.S. PATENT DOCUMENTS

| | | | | |
|---|---|---|---|---|
| 6,131,183 A * | 10/2000 | Tyler | ...................... | G06F 9/451 717/106 |
| 6,161,208 A * | 12/2000 | Dutton | ................ | G06F 11/1008 711/118 |
| 6,996,769 B1 * | 2/2006 | Peikes | ................. | G06F 17/2705 715/205 |
| 7,188,336 B2 * | 3/2007 | Humphries | ............... | G06F 8/73 717/101 |
| 7,627,833 B2 | 12/2009 | McKnight et al. | | |
| 8,954,869 B2 * | 2/2015 | Courteaux | ................ | G06F 8/38 715/708 |
| 2004/0103178 A1 * | 5/2004 | Michael O'Hara | .......................... | G06F 9/45512 709/223 |
| 2004/0117380 A1 * | 6/2004 | Perrow | ................... | G06F 3/0237 |
| 2005/0060693 A1 * | 3/2005 | Robison | .............. | G06F 9/45512 717/143 |
| 2006/0129980 A1 * | 6/2006 | Schmidt | .............. | G06F 9/45512 717/114 |
| 2007/0157115 A1 * | 7/2007 | Peters | ................. | G06F 3/04817 715/808 |
| 2008/0005752 A1 * | 1/2008 | Morris | ................ | G06F 9/45512 719/331 |

(Continued)

*Primary Examiner* — Thanh-Ha Dang
(74) *Attorney, Agent, or Firm* — Loza & Loza, LLP

(57) ABSTRACT

System and method for processing command line interface (CLI) commands of a CLI-based application, which include a help-like function to expose usage information of the CLI commands, use a database of CLI usage information to search for at least partial match to user query without user input to call the help-like function of CLI commands. As a result, at least one candidate CLI command from the CLI commands that corresponds to the at least partial match is selected and presented on a user interface for user selection to execute a CLI command.

20 Claims, 8 Drawing Sheets

(56) References Cited

U.S. PATENT DOCUMENTS

| | | | | |
|---|---|---|---|---|
| 2012/0155626 A1* | 6/2012 | Lemke | ............... | H04M 3/42042 |
| | | | | 379/142.04 |
| 2012/0185859 A1* | 7/2012 | Kashiwaya | ......... | G06F 9/30076 |
| | | | | 718/100 |
| 2014/0136761 A1* | 5/2014 | Li | ....................... | G06F 12/0246 |
| | | | | 711/103 |
| 2014/0195737 A1* | 7/2014 | Lilly | ................... | G06F 12/0891 |
| | | | | 711/122 |

* cited by examiner

SYSTEM AND METHOD FOR PROCESSING COMMAND LINE INTERFACE COMMANDS

BACKGROUND

Command line interface (CLI) applications are widely used to issue commands to execute computer operations using one or more inputs/parameters. CLI applications are typically preferred by advance computer users since they can provide a more concise and powerful means to control a program or operating system. As an example, CLI applications may be used to deploy various processing components of a computing infrastructure. The execution of CLI applications to deploy these processing components may be complex since one or more processing components of the computing infrastructure may have to be first deployed before other processing components can be deployed. In particular, information from previously deployed processing components in the computing infrastructure may be needed to deploy a subsequent processing component in the computing infrastructure using a particular CLI application.

While CLI applications are well adapted to be used for complex computer operations, such as deploying various processing components of a computing infrastructure, the use of these CLI applications does have some challenges. CLI applications can be difficult to use since the usage of the CLI applications may not be apparent. Each CLI application typically includes a description that can be accessed using some "help" command, such as Unix man command (CMD). On execution of this command for a CLI application, a description of its usage and parameter requirements of the CLI application are presented. Since each CLI application may require different parameters and dependencies of other CLI applications, it would be difficult for a user to keep track of all the different parameters and dependencies when the number of CLI applications that need to be considered is large. In addition, manually managing the different parameters and dependencies of different CLI applications can introduce human errors in processes involving multiple CLI applications.

SUMMARY

System and method for processing command line interface (CLI) commands of a CLI-based application, which include a help-like function to expose usage information of the CLI commands, use a database of CLI usage information to search for at least partial match to user query without user input to call the help-like function of CLI commands. As a result, at least one candidate CLI command from the CLI commands that corresponds to the at least partial match is selected and presented on a user interface for user selection to execute a CLI command.

Other aspects and advantages of embodiments of the present invention will become apparent from the following detailed description, taken in conjunction with the accompanying drawings, illustrated by way of example of the principles of the invention.

BRIEF DESCRIPTION OF THE DRAWINGS

Throughout the description, similar reference numbers may be used to identify similar elements.

DETAILED DESCRIPTION

It will be readily understood that the components of the embodiments as generally described herein and illustrated in the appended figures could be arranged and designed in a wide variety of different configurations. Thus, the following more detailed description of various embodiments, as represented in the figures, is not intended to limit the scope of the present disclosure, but is merely representative of various embodiments. While the various aspects of the embodiments are presented in drawings, the drawings are not necessarily drawn to scale unless specifically indicated.

The present invention may be embodied in other specific forms without departing from its spirit or essential characteristics. The described embodiments are to be considered in all respects only as illustrative and not restrictive. The scope of the invention is, therefore, indicated by the appended claims rather than by this detailed description. All changes which come within the meaning and range of equivalency of the claims are to be embraced within their scope.

Reference throughout this specification to features, advantages, or similar language does not imply that all of the features and advantages that may be realized with the present invention should be or are in any single embodiment of the invention. Rather, language referring to the features and advantages is understood to mean that a specific feature, advantage, or characteristic described in connection with an embodiment is included in at least one embodiment of the present invention. Thus, discussions of the features and advantages, and similar language, throughout this specification may, but do not necessarily, refer to the same embodiment.

Furthermore, the described features, advantages, and characteristics of the invention may be combined in any suitable manner in one or more embodiments. One skilled in the relevant art will recognize, in light of the description herein, that the invention can be practiced without one or more of the specific features or advantages of a particular embodiment. In other instances, additional features and advantages may be recognized in certain embodiments that may not be present in all embodiments of the invention.

Reference throughout this specification to "one embodiment," "an embodiment," or similar language means that a particular feature, structure, or characteristic described in connection with the indicated embodiment is included in at least one embodiment of the present invention. Thus, the phrases "in one embodiment," "in an embodiment," and similar language throughout this specification may, but do not necessarily, all refer to the same embodiment.

Figure 1:
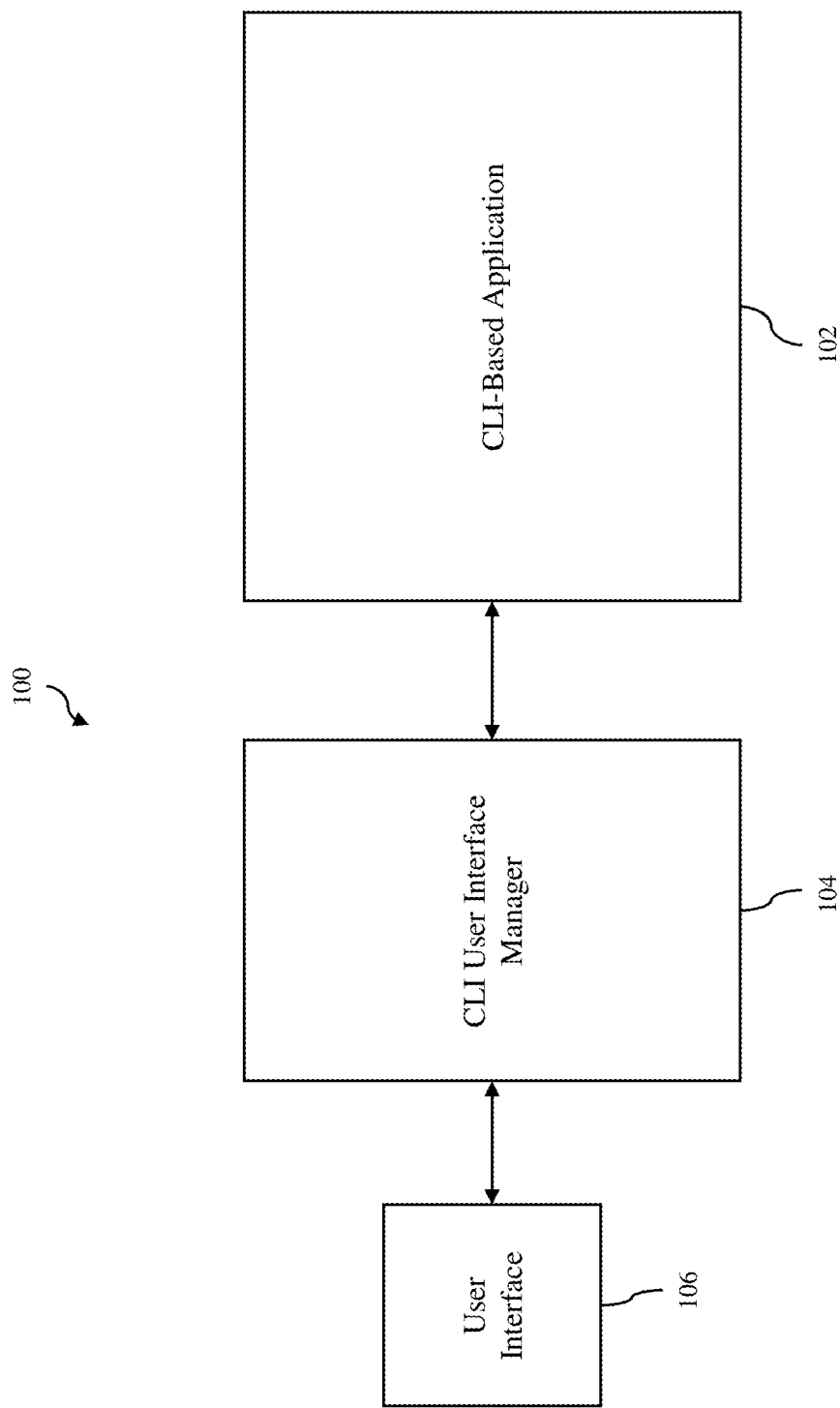
FIG. 1 is a block diagram of a command line interface (CLI) system in accordance with an embodiment of the invention.

FIG. 1 depicts a command line interface (CLI) system 100 in accordance with an embodiment of the invention. The CLI system can be used to perform CLI-based computer operations for various applications, such as deployment of one or more processing components for a computing environment, for example, a cloud computing environment. As used herein, a "processing component" can be any software entity or a group of software entities that can run on a computer system, such as a software application, a software process, a virtual machine (VM) or a "virtual container" that provides system-level process isolation. The processing component may be a component of a computing infrastructure. As an example, the computing infrastructure may be a multi-tier application infrastructure, a virtual datacenter infrastructure or a cloud computing infrastructure. As described in more detail below, the CLI system is designed so that users can easily find and execute appropriate CLI commands to perform the desired computer operations.

As shown in FIG. 1, the CLI system 100 includes a CLI-based application 102, which requires CLI commands to be entered to perform desired computer operations. As an example, the CLI-based application may be a cloud management and deployment application. However, the CLI-based application can be any application that performs computer operations using CLI commands.

CLI commands can vary in complexity depending on their usage and parameters required to execute the CLI commands. Some CLI commands may require one or more input parameters, which can only be derived from output of previously executed CLI commands. In order to determine the usage and input parameters, as well as outputs, of the CLI commands, users would typically have to call or open some sort of help function, for example, a manual command (man cmd) or a list function, to view usage guideline information regarding the CLI commands. The usage guideline information of a CLI command includes at least a description of the usage of the CLI command, any required input parameters to execute the CLI command and any output as a result of the CLI command execution. The input and output parameters described in man page can specify type as either integer (or floating point variable) or string. This can be done using specifications like <i> or <s>. This helps validation process at user interface (UI) level.

Below is a man (Unix style manual page) example of a vc-deploy command that deploys VC (VMware's vCenter Server) in a private cloud.

---

NAME
vc-deploy
DESCRIPTION
Create a VC VM in a private cloud.
SYNOPSIS
vc-deploy --vcBuild VC-BUILD-PATH --vcName VC-NAME
OPTIONS
    --vcBuild=<s>: VC build path
    --vcName=<s>: Name of the VC VM
OUTPUT
    IP Address: <s>
    Username: <s>
    Password: <s>

---

Similarly, below is a man (Unix style manual page) example of a vcd-deploy command that deploys VCD (VMware's Cloud Director) in a private cloud. It requires an existing instance of VC to connect.

---

NAME
vcd-deploy
DESCRIPTION
Create a VCD VM in a private cloud.
SYNOPSIS
vcd-deploy --vcdBuild VCD-BUILD-PATH --vcIp VC-IP --vcUser VC-USERNAME --vcPassword VC-PASSWORD --vcdName VCD-NAME
OPTIONS
    --vcdBuild=<s>: VCD build path
    --vcIp=<s>: VC IP address
    --vcUser=<s>: VC Username
    --vcPassword=<s>: VC Password
    --vcdName=<s>: Name of the VCD VM
OUTPUT
    IP Address: <s>
    Username: <s>
    Password: <s>

---

Conventionally, in order to perform to a desired computer operation using a CLI-based application, a user would need to know the usage and required input parameters of many CLI commands for that CLI-based application and select and execute the right CLI command so that the desired computer operation can be performed. In addition, the user would need to input the correct input parameter(s) in the exact format required for that CLI command. If a required parameter for a CLI command is not entered in the proper format, the execution of the CLI command would most likely result in an error, which would require the user to find the cause of the error, correctly enter the required parameter in the proper format and then execute the CLI command again. This process would have to be repeated for each error encountered when a CLI command is executed until every error has been corrected.

As shown in FIG. 1, the CLI system 100 further includes a CLI user interface manager 104, which provides a user interface 106 that allows users to easily find and use the appropriate CLI commands that are used in the CLI-based application 102, including validating the input parameters required for the CLI commands to reduce potential errors before the CLI commands are executed. In addition, the CLI user interface manager operates to decrease the need to obtain some of the input parameters for some of the CLI commands, which can reduce the processing time for performing some computer operations using CLI commands. Furthermore, the CLI user interface manager can operate with different types of CLI-based applications. Thus, the CLI user interface manager is agnostic with respect to the CLI-based application with which the CLI user interface manager is operating.

Figure 2:
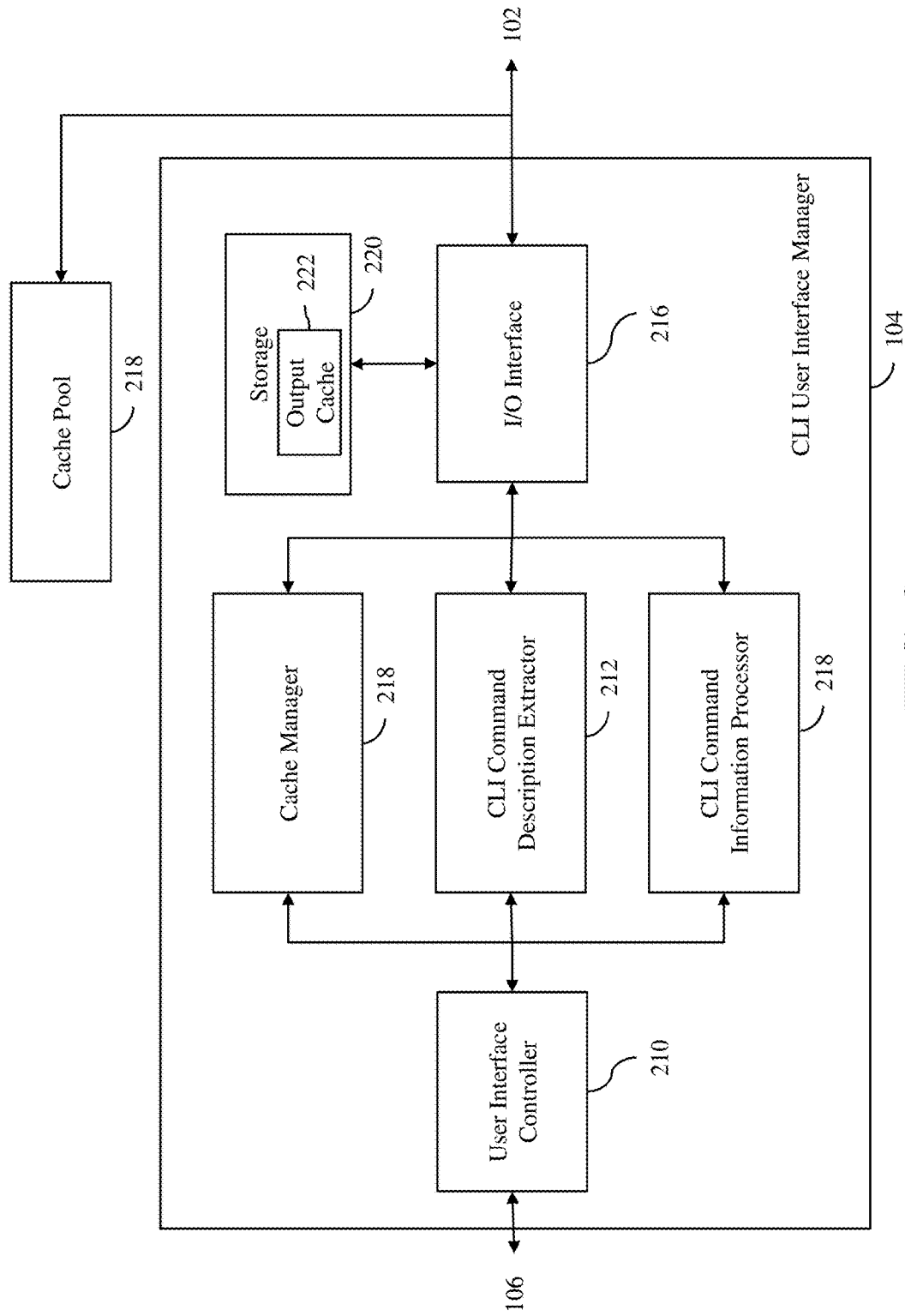
FIG. 2 is a block diagram of a CLI user interface manager of the CLI system in accordance with an embodiment of the invention

Turning now to FIG. 2, components of the CLI user interface manager 104 in accordance with an embodiment of the invention are illustrated. As shown in FIG. 2, the CLI user interface manager includes a user interface controller 210, a CLI command description extractor 212, a CLI command information processor 214, an input/output (I/O) interface 216 and an optional cache manager 218. These components of the CLI user interface manager may be implemented in any combination of software and/or firmware. In a particular implementation, these components are software programs running on one or more computer systems with at least memories and processors, and thus, are executed by processors of the computer systems.

The CLI command description extractor 212 of the CLI user interface manager 104 operates to automatically extract/parse information of CLI commands that are used in the CLI-based application 102. As noted above, the usage guideline information of a CLI command includes at least a description of the usage of the CLI command and any required input parameters to execute the CLI command, and may also include any output as a result of the CLI command execution. The CLI command description extractor is designed to access the information of each CLI command using a help-like function, for example, a manual command or a list function, for each of the CLI commands and parse or extract portions of the information to be used by the CLI user interface manager 104. The CLI command description extractor extracts at least the usage description, the required input parameter(s) and any output description for each CLI command. The extracted information from the CLI commands is used to create a database of CLI command information. The extracted information of each CLI command may be stored as a metadata object in the database and referenced to the corresponding CLI command using, for example, a hash function. The database of CLI command information can be maintained in storage 220 of the CLI user interface manager or any storage device or system that is accessible by the CLI user interface manager.

Figure 3:
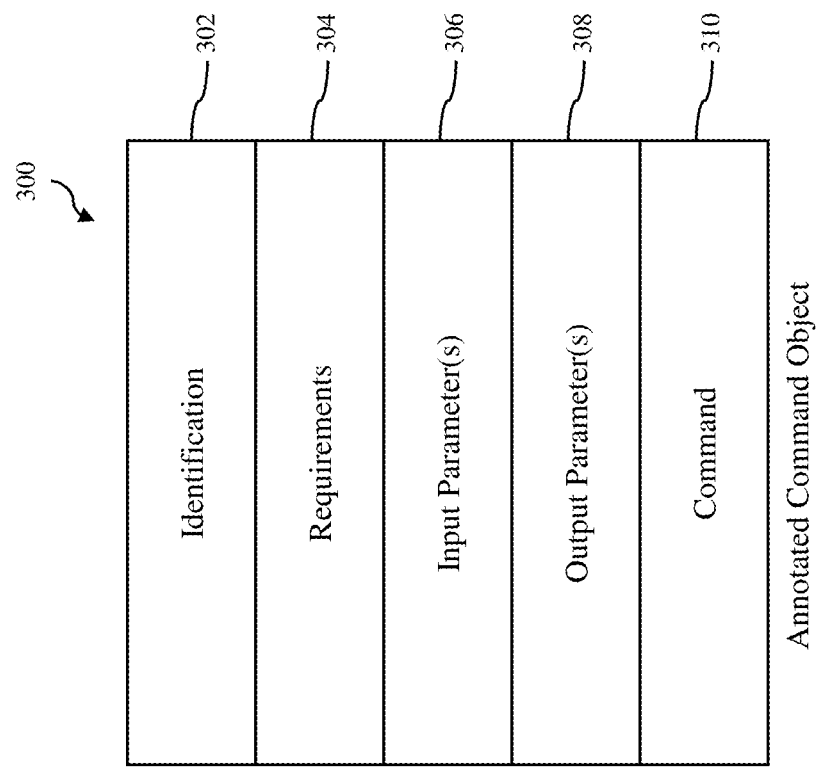
FIG. 3 is a diagram illustrating a generic annotated command object in accordance with an embodiment of the invention.

In an embodiment, the metadata object for a CLI command may be an annotated command object. An example of a generic annotated command object in accordance with an embodiment of the invention is illustrated in FIG. 3. As shown in FIG. 3, the annotated command object 300 includes an identification section 302, a requirement section 304, an input parameter section 306, an output parameter section 308, and a command section 310. Although a particular arrangement of these sections is illustrated in FIG. 3, different arrangements of the sections are possible. In addition, the annotated command object may include other sections with additional information.

The identification section 302 of the annotated command object 300 includes an identification that indicates the action to be performed using the annotated command object. As an example, the identification may indicate a processing component that will be deployed using the annotated command object or indicate a feature of a processing component that will be deployed or enabled using the annotated command object.

The requirement section 304 of the annotated command object 300 includes one or more required parameters that are needed to execute the action associated with the annotated command object. As an example, the requirements may include other processing components and/or features of the processing components that are required to execute the action associated with the annotated command object.

The input parameter section 306 of the annotated command object 300 includes one or more input parameters that are needed to execute the action associated with the annotated command object. As an example, the input parameters may include user identification, password and Internet Protocol (IP) address for a required processing component for the processing component being deployed using the annotated command object.

The output parameter section 308 of the annotated command object 300 includes one or more output parameters that are produced as a result of the action associated with the annotated command object. As an example, the output parameters may include user identification, password and Internet Protocol (IP) address for the processing component being deployed using the annotated command object. This section will also contain parser details of the required output parameters. This will help to extract out the required output parameters from the executed command.

The command section 310 of the annotated command object 300 includes one or more commands that are needed to execute the action associated with the annotated command object. As an example, the command may include one or more scripts, one or more executable files or one or more file pointers/file paths or one or more URIs (Uniform Resource Identifiers) satisfying REST (Representational State Transfer)/SOAP (Simple Object Access Protocol)/RPC (Remote Procedure call) endpoints.

As an example, an annotated command object for deploying a VMware® vCenter Server ("VC") (i.e., vc-deploy command described above) in accordance with an embodiment may be as follows:

```
#@PRODUCT=VC
#@REQUIRES=
#@TITLE="Creates a VC VM in a private cloud."
#@INPUT=2
#@VC.BUILD=?
#@VC.NAME=?
#@OUTPUT=3
#@VC.CONNECT.IP="IP address: ",15
#@VC.CONNECT.USER="Username: ",15
#@VC.CONNECT.PASSWORD= "Password: ",15
/mts/git/bin/vc-deploy --vcBuild $1 --vcName $2
```

As an example, an annotated command object for deploying a VMware® vCloud Director® ("VCD") (i.e., vcd-deploy command described above) in accordance with an embodiment may be as follows:

```
#@PRODUCT=VCD
#@REQUIRES=VC
#@TITLE="Creates a VCD VM in a private cloud."
#@INPUT=5
#@VCD.BUILD=?
#@VC.CONNECT.IP?
#@VC.CONNECT.USER?
#@VC.CONNECT.PASSWORD=?
#@VCD.NAME=?
#@OUTPUT=3
#@VCD.CONNECT.IP="IP address: ",15
#@VCD.CONNECT.USER="Username: ",15
#@VCD.CONNECT.PASSWORD= "Password: ",15
/mts/git/bin/vcd-deploy --vcdBuild $1 --vcIp $2 --vcUser $3 --vcPassword $4 -- vcdName $5
```

The VC component details above will be supplied by the user. Dependency resolution and consumption of preexisting dependent components can be an embodiment that will not mandate the component information from the user.

The associated data structures for a component or a product, which may include strings or a list of strings, are as follows:

```
==========
1.    CONNECT : {IP, PATH, USER, PASSWORD}
2.    RESOURCE : {CPU, MEM, STORAGE, FLASH, NETWORK}
3.    REQUIRES: {PRODUCT.COMPONENT.FEATURE}
============
In addition, REQUIRES can be as follows:
================
1.    REQUIRES=PRODUCT
2.    REQUIRES=PRODUCT.FEATURE
3.    REQUIRES=PRODUCT.COMPONENT.FEATURE
================
```

For REQUIRES, PRODUCT can be: PRODUCT=product/sub-product2/ . . . . COMPONENT can be: COMPONENT=component1/sub-component2/ . . . . FEATURE can be: FEATURE=feature1/sub-feature2/ . . . . Examples of PRODUCTS include VMware® vCloud Director® (VCD), VMware® ESX®, VMware® vCenter™ (VC) VMware vRealize Automation (VRA), VMware vRealize Operations (VROPS), VMware NSX™, VMware® vShield™, WINDOWS_VM (any Microsoft Windows VM), LINUX_VM (any Linux Distribution VM), DOCKER, PHOTON (VMware cluster for containers), KUBERNETES (Google's Cluster Manager for Linux containers), OSV (e.g. include VM infrastructure/mgmt nodes, container infrastructure/mgmt nodes, unikernel nodes, etc). Examples of COMPONENTS include CLUSTER, DATACENTER, RESOURCEPOOL. Examples of FEATURES include VMware vSphere® Distributed Resource Scheduler™ (DRS), VMware vSphere® High Availability (HA), VMware Enhanced vMotion Compatibility (EVC), VMware instant clone technology (VMFORK).

In the above annotated command object for deploying a VCD, line 1 is the identification of a product associated with the annotated command object, which in this example is a product named "VCD". Line 2 is the requirement section that specifies the requirements needed to deploy a VCD, which include "ESX", "VC.CLUSTER.ESX" and "VC.CLUSTER.DRS". Line 3 is the identification section that identifies the action to be performed using annotated command object, which in this example is "Deploys VCD". Lines 4-12 are the input parameter section that specifies the input parameters to deploy a VCD. In particular, line 4 specifies the number of input parameters specified in the annotated command object. In addition, lines 5-12 describe the different input parameters. The user will provide input specified at line 11 and 12. Skipping lines 13-16 for the moment, line 17 is the command section that specifies the command to be invoked when the annotated command object is executed. The command also specifies the number of input parameters, which is eight for this annotated command object. Lines 13-16 are the output parameter section that specifies the output parameters to be captured when the command invoked and the VCD is deployed. In particular, line 13 specifies the number of output parameters specified in the annotated command object. In addition, lines 14-16 describe the different output parameters that will be retrieved as a result of the deployment of the VCD product. As an example, "IP address:" will be searched and follow up 15 characters will be captured as VCD.CONNECT.IP for future usage.

Turning back to FIG. 2, the user interface controller 210 of the CLI user interface manager 104 operates to generate the user interface 106 for users to interact with the CLI system 100 using at least the database of CLI command information, which may be stored in the storage 220. The user interface allows users to enter text to search for CLI commands, select a CLI command from the search result that may include multiple candidate CLI commands, enter any input parameters that are needed for the selected CLI command, and then execute the selected CLI command. In some embodiments, the user interface automatically validates each input parameter entered for a selected CLI command before the CLI command is executed. That is, if a user enters an input parameter, which is not acceptable or proper, the user interface may indicate to the user that the entered parameter is not proper and instruct the user to re-enter a proper input parameter. In some implementations, the user interface may provide a reason why the entered input parameter is not acceptable, e.g., "entered value is not an integer," and provide instructions for entering a proper input parameter, e.g., "enter an integer." In some embodiments, the user interface provided by the user interface controller is a graphic user interface displayed on an electronic display device, such as a computer monitor. In a particular embodiment, the user interface controller may be implemented in a web server.

The CLI command information processor 214 of the CLI user interface manager 104 operates to provide at least some of the information used by the user interface controller 210. The CLI command information processor is able to access the database of CLI command information to use and process the CLI command information. The CLI command information processor is able to execute or initiate text searches on the database of CLI command information to find CLI command descriptions that best match text queries (using an indexer). Thus, the CLI command information processor can provide the user interface controller with suggestions of possible CLI commands when a user enters text using the user interface 106 to search for a particular CLI command. In some embodiments, the CLI command information processor may customize these suggestions for each user based upon past patterns of CLI command executions. As an example, the CLI command information processor may utilize one or more machine learning algorithms to select the most appropriate CLI commands for each user based upon the previously invoked CLI commands by that user or others. In some embodiments, the CLI command information processor may also provide some input parameters for a selected CLI command. In conventional CLI systems, each input parameter for a CLI command would need to be manually entered by a user. However, in the CLI system 100, the CLI command information processor can provide suggested input parameters for a CLI command selected by a user using the user interface, as described in more detail below. In a particular embodiment, the CLI command information processor may be implemented in an application server.

The I/O interface 216 of the CLI user interface manager 104 operates to interact with the CLI-based application 102. In particular, the I/O interface operates to transmit CLI commands from the CLI user interface manager 104 to the CLI-based application to be executed by the appropriate components of the CLI-based platform. These CLI commands include CLI commands that were selected and initiated by users using the user interface provided by the user interface controller 210. The I/O interface may also operate to receive output information of CLI commands that are executed by the CLI-based application. This output information may be presented to the users via the user interface. In addition, the output information may be processed and stored for future use.

The optional cache manager 218 of the CLI user interface manager 104 operates to process the output information of the executed CLI commands. The output information of an executed CLI command can be categorized into one of three categories, (1) transient or non-cacheable output, (2) static cacheable output and (3) dynamic cacheable output. Transient or non-cacheable output is transient output of a CLI command whose input parameter(s) may itself/themselves be transient. The output of these types of CLI commands should not be persisted for future use. An example of a transient or non-cacheable output is the output of a "date" command. Static cacheable output is static output of a CLI command whose input parameter(s) is/are also static. As used herein, the term "static" means non-transient and constant. The output of these types of CLI commands can be cached in an output cache 222 for future use, e.g., in the storage 220. For example, the output of these types of CLI commands can be cached in a map for quick retrieval when needed. An example of a static output is a list of passed test cases for a code change. Dynamic cacheable output is transient output of a CLI command whose input parameter(s) is/are non-transient. For example, such a CLI command may be a provisioning command. In this example, even though the input could be a specific build type that stays constant, the output may need to be a different Internet Protocol (IP) or virtual machine (VM) name for each deployment. The results of these types of CLI commands can be cached for future use. This can be accomplished by caching results of the CLI commands for future usage in a cache pool 224. When the same command is requested, the corresponding result can be retrieved from the cache pool and the cache pool can be replenished of the retrieved result for future use or consumption. According to the usage pattern of the cached results, the results of the most commonly executed CLI commands can be increased. As an example, the cache pool may be part of a computer operating environment in which software components, such VMs and management servers or products, are deployed for future use.

In operation, before a CLI command is executed by the CLI-based application 102, the cache manager 218 can determine type of the CLI command based upon the content of output section (e.g., by pattern matching against a predefined list of CLI command outputs in the database). If the CLI command is the type that produces transient or non-cacheable output, then the cache manager initiates the execution of the CLI command by transmitting the CLI command to the CLI-based application. The output of this CLI command is not saved or cached for future use.

If the CLI command is the type that produces static cacheable output, the cache manager 218 checks the output cache 222 to determined whether the output of the CLI command being executed is stored in the output cache. If the output of the CLI command being executed is found in the output cache, the output stored in the output cache is used as the output of the CLI command without having to actually execute the CLI command to produce the output. This output retrieved from the output cache can be presented to the user via the user interface 106. If the output of the CLI command being executed is not found in the output cache, the cache manager initiates the execution of the CLI command and stores a copy of the output in the output cache for future use.

If the CLI command is the type that produces dynamic cacheable output, then the cache manager 218 checks the cache pool 224 to determined whether the result of the CLI command being executed is stored in the cache pool. If the result is found in the cache pool, the cache manager retrieves the cached result for current consumption without having to first execute the CLI command. The cache manager then initiates the execution of the CLI command to replenish the cache pool of the retrieved result. However, if the result is not found in the cache pool, the cache manager initiates the execution of the CLI command twice to produce the desired result for current use and to cache the duplicate result in the cache pool for future use.

After a CLI command is executed by the CLI-based application 102, the cache manager 218 determines whether the output of the CLI command is non-cacheable or static cacheable. If the output of the CLI command is non-cacheable, the cache manager disregards the output and does not save or cache the output. If the output of the CLI command is static cacheable and not already saved in the output cache 222, the cache manager saves or caches the output for future use. If the output of the CLI command is dynamic cacheable and the result of such CLI command is not already stored in the cache pool 224, the cache manager saves or caches the output for future use.

Using the output cache and the cache pool, the CLI system 100 is able to supply the output of certain CLI commands without having to execute the CLI commands to produce the output. Thus, the CLI system can process CLI commands much more quickly than conventional CLI systems that execute each CLI command in order to produce the desired output.

FIGS. 4A-4D illustrate an exemplary process of using the user interface 106 of the CLI system 100 in accordance with an embodiment. In this example, the user interface is a graphic user interface (GUI) 400 on a web page, which is provided by the user interface controller 210 of the CLI user interface manager 104. As shown in these figures, the GUI includes a query box 402 for a user to enter one or more keywords (e.g., characters, symbols and/or numbers) to search for CLI commands. In this example, the CLI commands are in the form of CLI scripts. The GUI further includes a guide section 404, which provides a usage description of one of the suggested CLI scripts, which are presented in response to user input using the query box. The GUI further includes an execute button 406 to execute a user-selected CLI script.

Figure 4A:
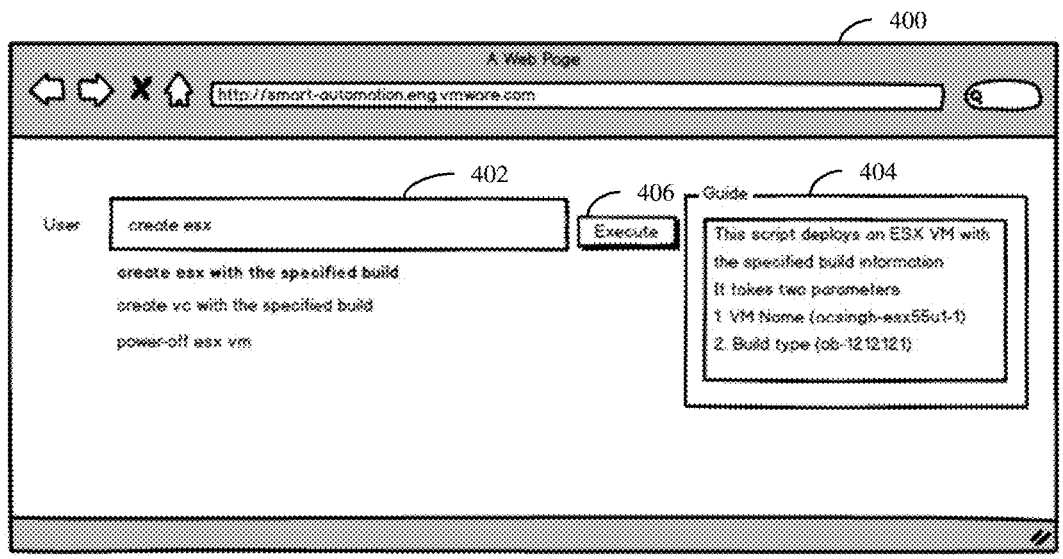
FIGS. 4A-4D illustrate an exemplary process of using a user interface of the CLI system in accordance with an embodiment of the invention.

As illustrated in FIG. 4A, when a user enters one or more keywords in the query box 402 of the GUI 400, the entered characters, symbols and/or numbers (collectively referred to herein as "text") are used to automatically provide one or more CLI commands, e.g., CLI scripts, to use as suggestions. This may be achieved by the CLI command interface processor 214 of the CLI user interface manager 104 using a search software/indexer. The suggested CLI commands may be the most often executed CLI commands by this user and other users for the entered text. These suggestions can be customized for each user based upon the past patterns of CLI command executions. In an embodiment, machine learning algorithms may be used by the CLI command interface processor to select the most appropriate CLI commands for the current user based upon previously executed CLI commands by the user or other users. Before one of the suggested CLI commands is selected by the user, a usage description of the top suggested CLI command may be presented in the guide section 404 of the GUI.

In the example shown in FIG. 4A, the user has entered "create esx" in the query box 402 of the GUI 400. As a result, three CLI scripts have been found and suggested. These CLI scripts included "create esx with the specified build," "create vc with the specified build" and "power-off esx vm," which are presented in the GUI below the query box. In this example, the "create esx with the specified build" script is the top suggestion, which is presented in bold text. Thus, the usage description of this script is presented in the guide section 404 of the GUI.

Figure 4B:
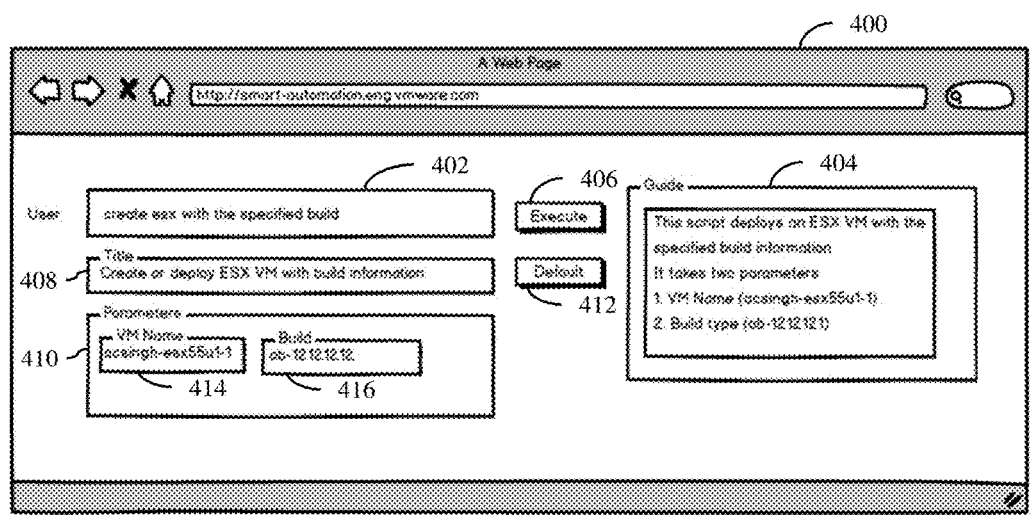

As illustrated in FIG. 4B, when the user selects a suggested CLI command or script, two additional sections 408 and 410 and a default button 412 will appear in the GUI 400. In addition, the other suggested CLI commands or scripts will disappear in the GUI. In a particular implementation, another web page may open with the additional sections and button. The two additional sections include a title section 408 and a parameters section 410. The title section will have the title of the selected CLI script. The parameters section includes boxes 414 and 416 for the input parameters needed for the selected CLI script. In the example illustrated in FIG. 4B, the parameters section includes a VM name box 414 and a build box 416, which need to be filled in. The user may manually enter the parameters in the appropriate boxes. However, if the default button is pressed, the parameters will be filled in automatically by the user interface controller. If a username is needed, the GUI can automatically fill in the username box using the username of the logged-in user and the type of VM being requested. If a build information is needed, then the build box can be filled with the most deployed information. If a dependent build information is needed, then the cache pool 224 can be searched to find the appropriate product. If such a product is found, then its IP address will be used to fill in the build box. If the appropriate product is not found in the cache pool, "To be deployed" will show up in the build box. Before the CLI script can be executed, each mandatory parameter must be filled in.

Figure 4C:
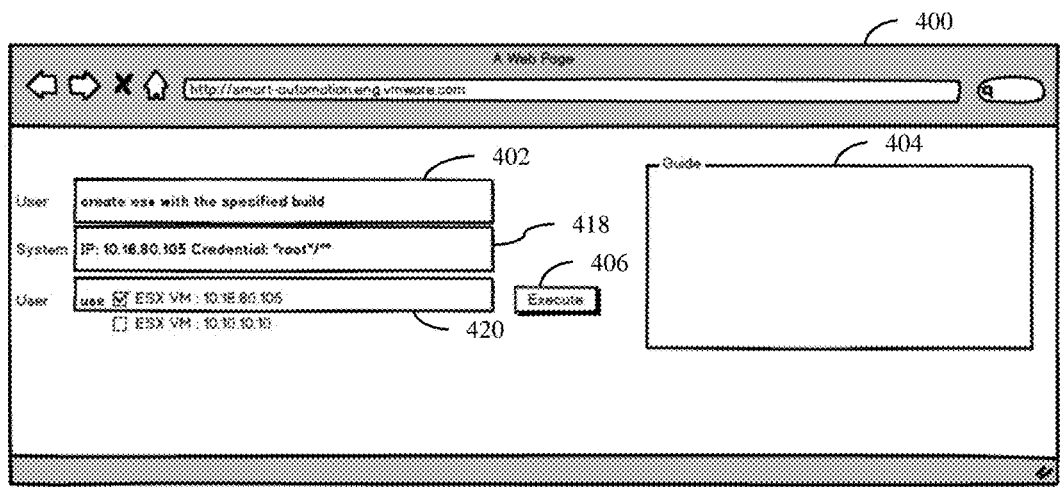

As illustrated in FIG. 4C, after the CLI script has been executed, the output of the CLI script is presented to the user in the GUI 400 in a text box 418, which is called "System." In this example, the output of the CLI script is an IP address of the VM and the credentials to log in to this VM. In addition, another "query box" 420 will be presented in the GUI for further operation using the result of the executed CLI script, such as further deployment using the newly created ESX VM. In FIG. 4C, the user has entered "use" in the query box 420, which automatically produce a list of all the VM information deployed so far, for example, ESX VM: 10.18.80.105 and ESX VM: 10.10.10.10. The user can select one of the VM information in the list to execute additional operation. In FIG. 4C, the user has selected the first VM, i.e., ESX VM: 10.18.80.105 using a check box. The phrase "use ESX VM: 10.18.80.105" in the query box 420 is then used to present CLI script suggestions in the same manner as described above with respect the query "create esx."

Figure 4D:
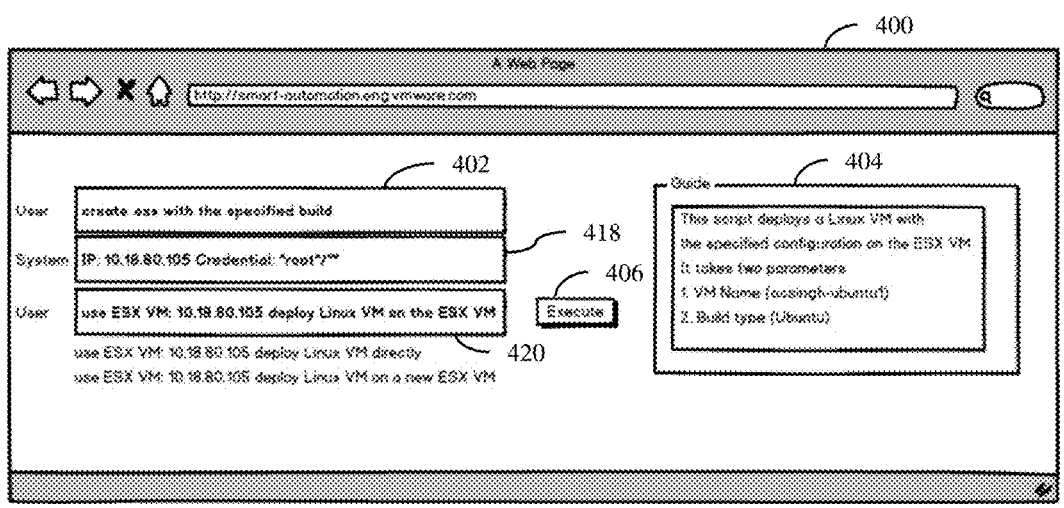

As shown in FIG. 4D, since the user has selected "ESX VM: 10.18.80.105" after entering "use" in the query box 420, three new CLI scripts have been found and suggested. These CLI scripts include "use ESX VM: 10.18.80.105 deploy Linux VM on the ESX VM," "use ESX VM: 10.18.80.105 deploy Linux VM directly" and "use ESX VM: 10.18.80.105 deploy Linux VM on a new ESX VM," which may be presented in the GUI below the query box. In FIG. 4D, the top suggestion is presented in the query box 420. The usage description of the top suggested script is presented in the guide section 404 of the GUI. After the user selects one of these suggested CLI scripts, the process then proceeds in a similar manner as previously described with respect to the selected "create esx with the specified build" script.

As illustrated in FIGS. 4A-4D, the CLI system 100 provides a user friendly interface to easily find the right CLI commands to perform desired computer operations, such as deploy one or more processing components, and to easily enter any input parameters for the CLI commands.

Figure 5A:
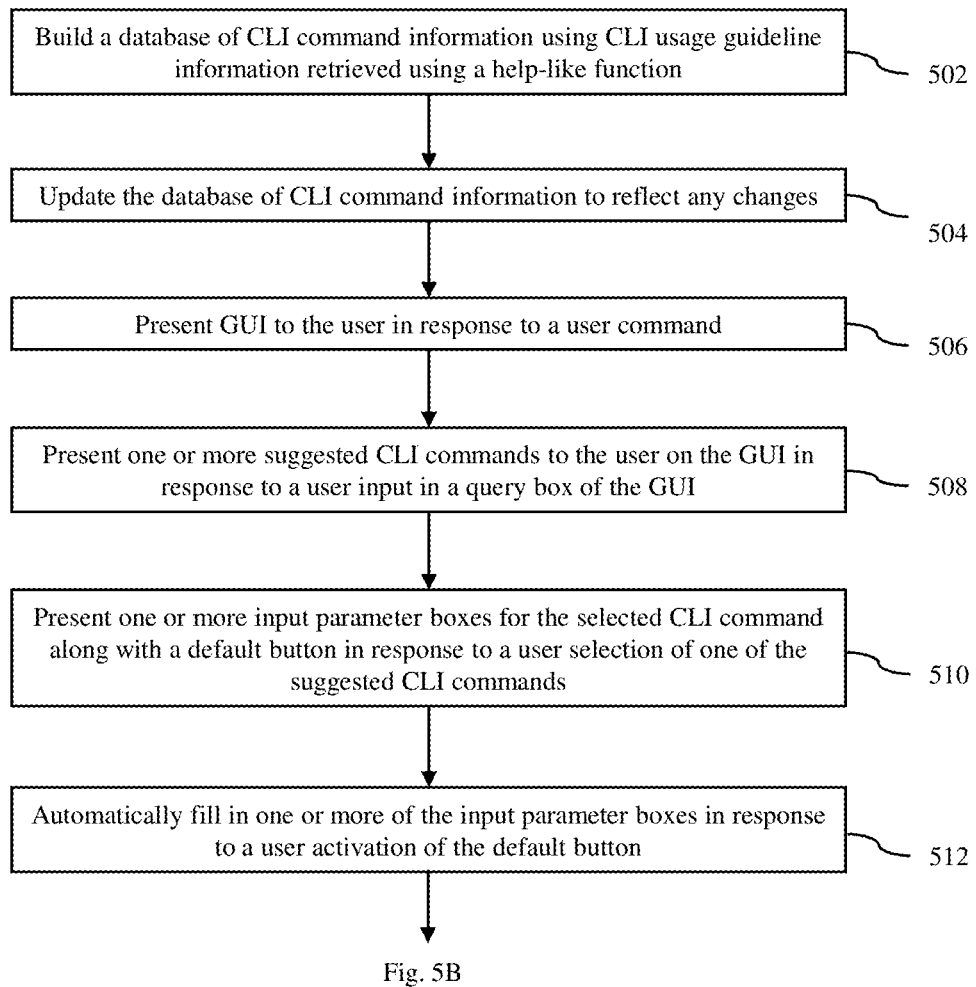
FIGS. 5A and 5B is a process flow diagram of an overall operation of the CLI system in accordance with an embodiment of the invention.
Figure 5B:
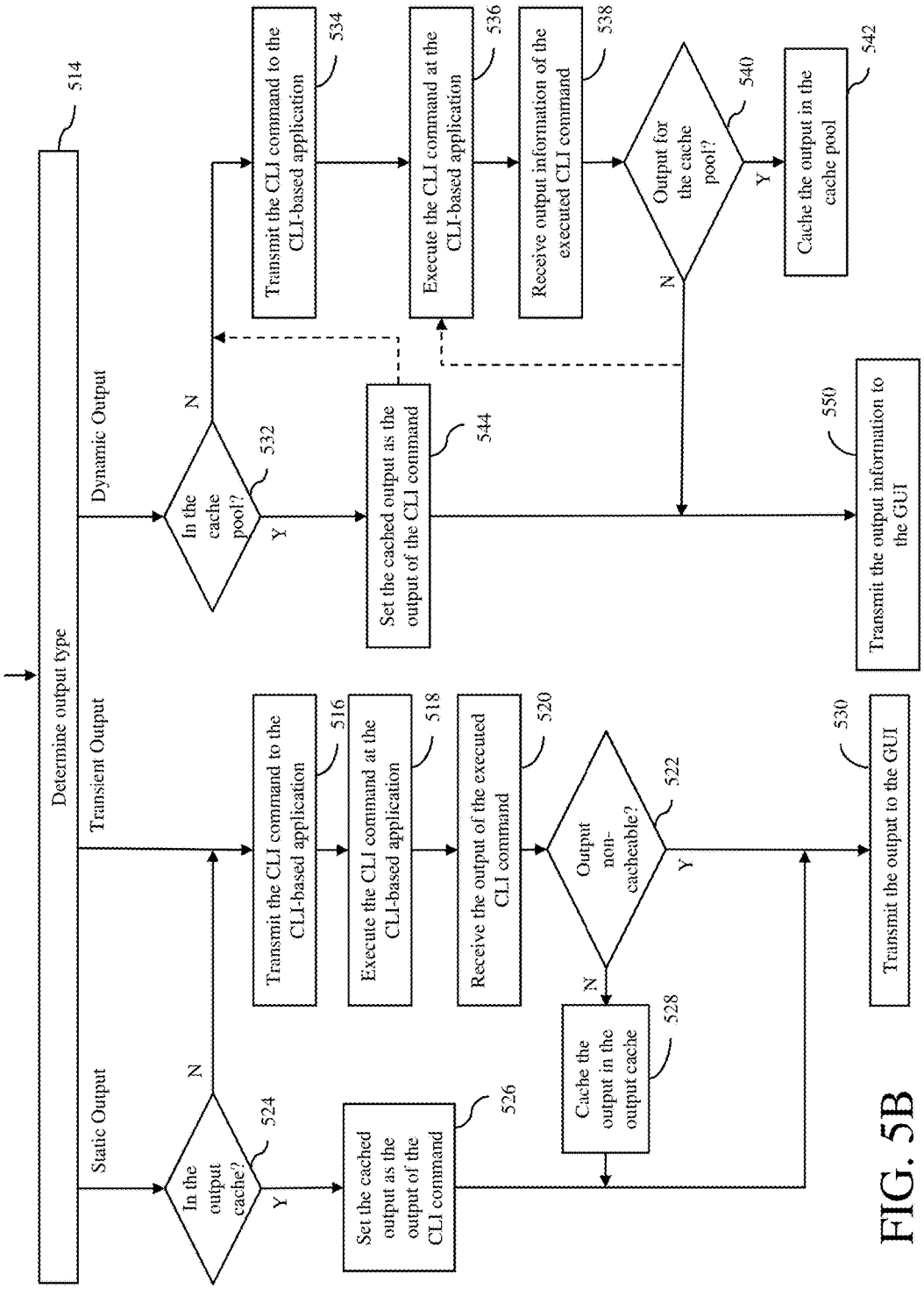

An overall operation of the CLI system 100 in accordance with an embodiment of the invention will be described with reference to a flow diagram of FIG. 5. At block 502, a database of CLI command information is built by the CLI command information processor 214 using CLI usage guideline information retrieved using a help-like function, such as manual or help function, for each CLI command used in the CLI-based application 102. As an example, the help-like function may be called using "$CMD-help" command or "man $CMD" command. The database of CLI command information may be built by executing a command to activate the help-like function. The building of the database of CLI command information may include search engine indexing, which may involve collecting, parsing and storing the CLI command information to facilitate fast and accurate information retrieval.

Next, at block 504, the database of CLI command information may be updated by the CLI command information processor 214 to reflect any changes that can affect the CLI command information stored in the database, such as addition of new CLI commands or changes to any required input parameters for the CLI commands. The database of CLI command information may be updated periodically or may be updated due to a trigger event, such as addition of one or more CLI commands in a folder or directory where CLI commands are being stored.

Next, at block 506, in response to a user command, the GUI 400 is presented to the user, for example, on a webpage, by the user interface controller 210. As an example, the user command may be a log in to the webpage. Next, at block 508, in response to a user input in the query box 402 of the GUI, one or more suggested CLI commands are presented to the user on the GUI. In some embodiments, the usage description of the top suggested CLI command is presented in the guide section 404 of the GUI. Next, at block 510, in response to a user selection of one of the suggested CLI commands, one or more input parameter boxes 414 and 416 for the selected CLI command are presented in the parameters section 410 of the GUI along with the default button 412.

Next, at block 512, in response to a user activation of the default button 412 on the GUI 400, one or more of the input parameter boxes are automatically filled in by the GUI. The default parameters may be provided to the GUI by the CLI command information processor 214 using historical data for the current CLI command.

Next, at block 514, in response to a user activation of the execute button 406 on the GUI 400, the output type of the CLI command being executed is determined by the cache manager 218. If the CLI command is the type that produces transient or non-cacheable output, the operation proceeds to block 516, where the CLI command is transmitted to the CLI-based application 102 via the I/O interface 216 for execution. Next, at block 518, the CLI command is executed at the CLI-based application, which results in an output. Next, at block 520, the output of the executed CLI command is received from the CLI-based application at the cache manager via the I/O interface. Next, at block 522, a determination is made by the cache manager whether the output of the executed CLI command is non-cacheable. For the CLI command type that produces transient or non-cacheable output, the operation proceeds to step 530, where the output is transmitted to the GUI via the user interface controller 210 to be presented to the user. If the CLI command is determined to be the type that produces static cacheable output at block 514, the operation then proceeds to block 524, where the cache manager 218 determines whether the output of the CLI command being executed is cached in the output cache. If the output of the CLI command is found in the output cache, the operation proceeds to block 526, where the cached output from the output cache is set as the output of the CLI command. The operation then proceeds to block 530, where the output is transmitted to the GUI 400 via the user interface controller to be presented to the user. However, if the output of the CLI command being executed is not found in the output cache at block 524, the operation proceeds to block 516, where the CLI command is transmitted to the CLI-based application to produce an output. In this scenario, a copy of the output of executed CLI command is saved or cached in the output cache for future use by the cache manager, at block 528, before the output is transmitted to the GUI, at block 530.

If the CLI command is determined to be the type that produces dynamic cacheable output at block 514, the operation then proceeds to block 532, where a determination is made by the cache manager 218 whether the output or result of the CLI command being executed is cached or stored in the cache pool. As an example, the output or result of a CLI command in the cache pool may be a processing component that is deployed in a computer operating environment in a quiesced state. If the output of the CLI command being executed is not found in the cache pool at block 532, the operation proceeds to block 534, where the CLI command is transmitted to the CLI-based application 102 via the I/O interface 216 for execution. Next, at block 536, the CLI command is executed at the CLI-based application, which deploys an output, e.g., a processing component. Next, at block 538, information regarding the output of the executed CLI command is received from the CLI-based application at the cache manager 218 via the I/O interface 216. Next, at block 540, a determination is made by the cache manager whether the output of the executed CLI command is to be cached or stored in the cache pool. If yes, then the output is cached in the cache pool for future use, at block 542. This caching process may also involve storing the information regarding the output in any storage accessible by the cache manager 218, e.g., the storage 220. If the output is not to be cached, then the operation proceeds to block 550, where the information regarding the output of the executed CLI command is transmitted to the GUI 400 via the user interface controller 210 to be presented to the user so that the output can be used for immediate consumption. In addition, the operation proceeds back to block 536 (as indicated by the dotted arrow from block 540 to block 536), where the CLI command is executed again to produce another output of the executed CLI command so that the output can be cached in the cache pool for future use.

If the output of the CLI command being executed is found in the cache pool at block 532, the operation proceeds to block 544, where the cached output from the cache pool is set as the output of the CLI command. In addition, at block 544, the information regarding the cached output found in the cache pool, which may be stored in the storage 220, can be retrieved by the cache manager 218. In some embodiments, the CLI command may be transmitted to the CLI-based application by the cache manager so that a new output can be produced (as indicated by the dotted arrow from block 544 to block 534), which will be used to replace or replenish the output taken from the cache pool. Next, at block 550, the information regarding the output retrieved from the cache pool is transmitted to the GUI 400 via the user interface controller 210 to be presented to the user so that the output can be used.

Figure 6:
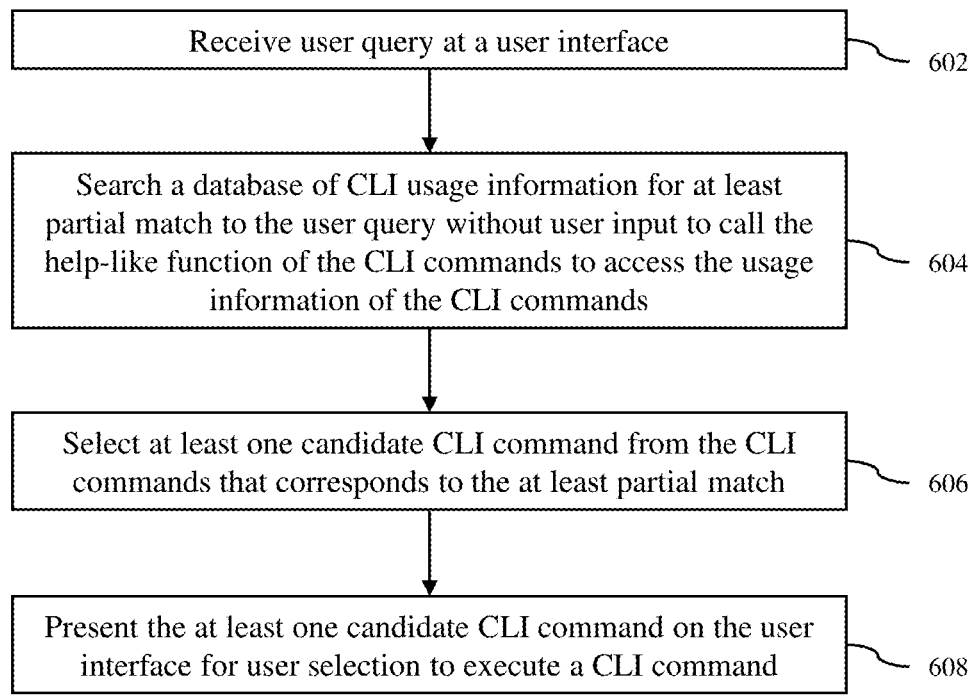
FIG. 6 is a process flow diagram of the operation of the PCD system in accordance with an embodiment of the invention.

A method for processing command line interface (CLI) commands of a CLI-based application, which include a help-like function to access usage information of the CLI commands, in accordance with an embodiment of the invention is now described with reference to the process flow diagram of FIG. 6. At block 602, user query is received at a user interface. Next, at block 604, a database of CLI usage information is searched for at least partial match to the user query without user input to call the help-like function of the CLI commands to access the usage information of the CLI commands. Next at block 606, at least one candidate CLI command that corresponds to the at least partial match from the CLI commands. Next, at block 608, the at least one candidate CLI command is presented on the user interface for user selection to execute a CLI command.

Although the operations of the method(s) herein are shown and described in a particular order, the order of the operations of each method may be altered so that certain operations may be performed in an inverse order or so that certain operations may be performed, at least in part, concurrently with other operations. In another embodiment, instructions or sub-operations of distinct operations may be implemented in an intermittent and/or alternating manner. Also, some of the steps can be repeated multiple times.

It should also be noted that at least some of the operations for the methods may be implemented using software instructions stored on a computer useable storage medium for execution by a computer. As an example, an embodiment of a computer program product includes a computer useable storage medium to store a computer readable program that, when executed on a computer, causes the computer to perform operations, as described herein.

Furthermore, embodiments of at least portions of the invention can take the form of a computer program product accessible from a non-transitory computer-usable or computer-readable medium providing program code for use by or in connection with a computer or any instruction execution system. For the purposes of this description, a non-transitory computer-usable or computer readable medium can be any apparatus that can contain, store, communicate, propagate, or transport the program for use by or in connection with the instruction execution system, apparatus, or device.

The non-transitory computer-useable or computer-readable medium can be an electronic, magnetic, optical, electromagnetic, infrared, or semiconductor system (or apparatus or device). Examples of a non-transitory computer-readable medium include a semiconductor or solid state memory, magnetic tape, a removable computer diskette, a random access memory (RAM), a read-only memory (ROM), a rigid magnetic disc, and an optical disc. Current examples of optical discs include a compact disc with read only memory (CD-ROM), a compact disc with read/write (CD-R/W), a digital video disc (DVD), and a Blu-ray disc.

In the above description, specific details of various embodiments are provided. However, some embodiments may be practiced with less than all of these specific details. In other instances, certain methods, procedures, components, structures, and/or functions are described in no more detail than to enable the various embodiments of the invention, for the sake of brevity and clarity.

Although specific embodiments of the invention have been described and illustrated, the invention is not to be limited to the specific forms or arrangements of parts so described and illustrated. The scope of the invention is to be defined by the claims appended hereto and their equivalents.

What is claimed is:

1. A method for processing command line interface (CLI) commands of a CLI-based application, the CLI commands including a help-like function to expose usage information of the CLI commands, the method comprising:
   receiving user query at a user interface;
   searching a database of CLI usage information for at least partial match to the user query without user input to call the help-like function of the CLI commands to access the usage information of the CLI commands;
   selecting at least one candidate CLI command from the CLI commands that corresponds to the at least partial match;
   presenting the at least one candidate CLI command on the user interface for user selection to execute a CLI command;
   determining that an output of a candidate CLI command is dynamic, wherein a dynamic output is a transient output of a CLI command with at least one input parameter that is non-transient;
   searching the output of the candidate CLI command in a cache pool to find the output; and using the output in the cache pool for the candidate CLI command without actually executing the candidate CLI command at the CLI-based application to deploy the output for immediate consumption.

2. The method of claim 1, further comprising automatically filling in a parameter for a selected candidate CLI command in the user interface in response to user input.

3. The method of claim 1, further comprising automatically validating a parameter for a selected candidate CLI command at the user interface before the selected candidate CLI command is executed by the CLI-based application.

4. The method of claim 1, further comprising:
determining that an output of another candidate CLI command is not transient, wherein a transient output is a non-cacheable output of a CLI command with at least one input parameter that is transient;
searching the output of the another candidate CLI command in the cache pool to find the output of the another candidate CLI command; and
using the output of the another candidate CLI command in the cache pool for the another candidate CLI command without actually executing the another candidate CLI command at the CLI-based application to deploy the output of the another candidate CLI command for immediate consumption.

5. The method of claim 4, further comprising, when an output of a target candidate CLI command is not found in the output cache, executing the target candidate CLI command at the CLI-based application and storing a resulting output of the target candidate CLI command in the output cache for future use.

6. The method of claim 1, further comprising:
determining that an output of another candidate CLI command is dynamic, wherein a dynamic output is a transient output of a CLI command with at least one input parameter that is non-transient;
searching the output of the another candidate CLI command in the cache pool and determining that the output of the another candidate CLI command is not in the cache pool; and
executing the another candidate CLI command at the CLI-based application twice to deploy a first resulting processing component for immediate consumption and to deploy a second resulting processing component for storing the second resulting processing component of the another candidate CLI command in the cache pool for future use.

7. The method of claim 6, wherein the second resulting processing component is stored in the cache pool in a quiesced state.

8. A non-transitory computer-readable storage medium containing program instructions for a method for processing command line interface (CLI) commands of a CLI-based application, the CLI commands including a help-like function to expose usage information of the CLI commands, wherein execution of the program instructions by one or more processors of a computer system causes the one or more processors to perform steps comprising:
receiving user query at a user interface;
searching a database of CLI usage information for at least partial match to the user query without user input to call the help-like function of the CLI commands to access the usage information of the CLI commands;
selecting at least one candidate CLI command from the CLI commands that corresponds to the at least partial match;
presenting the at least one candidate CLI command on the user interface for user selection to execute a CLI command;
determining that an output of a candidate CLI command is dynamic, wherein a dynamic output is a transient output of a CLI command with at least one input parameter that is non-transient:
searching the output of the candidate CLI command in a cache pool to find the output; and
using the output in the cache pool for the candidate CLI command without actually executing the candidate CLI command at the CLI-based application to deploy the output for immediate consumption.

9. The non-transitory computer-readable storage medium of claim 8, wherein the method further comprises automatically filling in a parameter for a selected candidate CLI command in the user interface in response to user input.

10. The non-transitory computer-readable storage medium of claim 8, wherein the method further comprises automatically validating a parameter for a selected candidate CLI command at the user interface before the selected candidate CLI command is executed by the CLI-based application.

11. The non-transitory computer-readable storage medium of claim 8, wherein the method further comprises:
determining that an output of another candidate CLI command is not transient, wherein a transient output is a non-cacheable output of a CLI command with at least one input parameter that is transient;
searching the output of the another candidate CLI command in the cache pool to find the output of the another candidate CLI command; and
using the output of the another candidate CLI command in the cache pool for the another candidate CLI command without actually executing the another candidate CLI command at the CLI-based application to deploy the output of the another candidate CLI command for immediate consumption.

12. The non-transitory computer-readable storage medium of claim 11, wherein the method further comprises, when an output of a target candidate CLI command is not found in the output cache, executing the target candidate CLI command at the CLI-based application and storing a resulting output of the target candidate CLI command in the output cache for future use.

13. The non-transitory computer-readable storage medium of claim 8, wherein the method further comprises:
determining that an output of another candidate CLI command is dynamic, wherein a dynamic output is a transient output of a CLI command with at least one input parameter that is non-transient;
searching the output of the another candidate CLI command in the cache pool and determining that the output of the another candidate CLI command is not in the cache pool; and
executing the another candidate CLI command at the CLI-based application twice to deploy a first resulting processing component for immediate consumption and to deploy a second resulting processing component for storing the second resulting processing component of the another candidate CLI command in the cache pool for future use.

14. The non-transitory computer-readable storage medium of claim 8, wherein the second resulting processing component is stored in the cache pool in a quiesced state.

15. A system comprising:
memory; and
at least one processor programmed to:
receive user query at a user interface;
search a database of CLI usage information for at least partial match to the user query without user input to call a help-like function of CLI commands of a CLI-based application to access usage information of the CLI commands;
select at least one candidate CLI command from the CLI commands that corresponds to the at least partial match;
present the at least one candidate CLI command on the user interface for user selection to execute a CLI command;
determine that an output of a candidate CLI command is dynamic, wherein a dynamic output is a transient output of a CLI command with at least one input parameter that is non-transient;
search the output of the candidate CLI command in a cache pool to find the output; and
use the output in the cache pool for the candidate CLI command without actually executing the candidate CLI command at the CLI-based application to deploy the output for immediate consumption.

16. The system of claim 15, wherein the at least one processor is programmed to automatically fill in a parameter for a selected candidate CLI command in the user interface in response to user input.

17. The system of claim 15, wherein the at least one processor is programmed to automatically validate a parameter for a selected candidate CLI command at the user interface before the selected candidate CLI command is executed by the CLI-based application.

18. The system of claim 15, wherein the at least one processor is programmed to:
determine that an output of another candidate CLI command is not transient, wherein a transient output is a non-cacheable output of a CLI command with at least one input parameter that is transient;
search the output of the another candidate CLI command in the cache pool to find the output of the another candidate CLI command; and
use the output of the another candidate CLI command in the cache pool for the another candidate CLI command without actually executing the another candidate CLI command at the CLI-based application to deploy the output of the another candidate CLI command for immediate consumption.

19. The system of claim 18, wherein the at least one processor is programmed to: when an output of a target candidate CLI command is not found in the output cache, executing the target candidate CLI command at the CLI-based application and storing a resulting output of the target candidate CLI command in the output cache for future use.

20. The system of claim 15, wherein the at least one processor is programmed to:
determine that an output of another candidate CLI command is dynamic, wherein a dynamic output is a transient output of a CLI command with at least one input parameter that is non-transient;
search the output of the another candidate CLI command in the cache pool and determine that the output of the another candidate CLI command is not in the cache pool; and
execute the another candidate CLI command at the CLI-based application twice to deploy a first resulting processing component for immediate consumption and to deploy a second resulting processing component for storing the second resulting processing component of the another candidate CLI command in the cache pool for future use.

* * * * *